United States Patent
Thomas et al.

(10) Patent No.: US 7,217,133 B2
(45) Date of Patent: May 15, 2007

(54) METHOD FOR TREATING PERVASIVE DEVELOPMENT DISORDER

(76) Inventors: Jeanine Thomas, 5219 S. Mason, Chicago, IL (US) 60638; Jamie Ann Bodden, 40 The Elms, Forester Street, Galway (IE); Lisa Burger, 2186 Appaloosa Ct. East, Wheaton, IL (US) 60187

( * ) Notice: Subject to any disclaimer, the term of this patent is extended or adjusted under 35 U.S.C. 154(b) by 161 days.

(21) Appl. No.: 10/407,294

(22) Filed: Apr. 4, 2003

(65) Prior Publication Data
US 2004/0241628 A1 Dec. 2, 2004

Related U.S. Application Data

(60) Provisional application No. 60/369,990, filed on Apr. 4, 2002.

(51) Int. Cl.
*G09B 19/00* (2006.01)
(52) U.S. Cl. .................................... 434/236; 434/237
(58) Field of Classification Search ................ 434/118, 434/156, 185, 236–238, 258, 350, 362, 365; 600/300, 544; 705/3; 424/773; 530/309; 345/753
See application file for complete search history.

(56) References Cited

U.S. PATENT DOCUMENTS

| | | | | |
|---|---|---|---|---|
| 5,828,943 A * | 10/1998 | Brown | ...................... | 434/258 |
| 5,961,332 A * | 10/1999 | Joao | ........................... | 434/236 |
| 6,012,926 A * | 1/2000 | Hodges et al. | ............... | 434/236 |
| 6,053,739 A * | 4/2000 | Stewart et al. | ............... | 434/236 |
| 6,056,549 A | 5/2000 | Fletcher | | |
| 6,225,920 B1 | 5/2001 | Dayle | | |
| 6,293,801 B1 | 9/2001 | Jenkins et al. | | |
| 6,296,487 B1 | 10/2001 | Lotecka | | |
| 6,338,039 B1 * | 1/2002 | Lonski et al. | .................. | 705/3 |
| 6,425,764 B1 * | 7/2002 | Lamson | ...................... | 434/236 |
| 6,491,525 B1 * | 12/2002 | Hersh | ......................... | 434/236 |
| 6,632,461 B1 * | 10/2003 | Slimak | ....................... | 424/773 |
| 6,644,976 B2 * | 11/2003 | Kullok et al. | ............... | 434/236 |
| 6,660,831 B2 * | 12/2003 | Fallon | ........................ | 530/309 |
| 6,719,690 B1 * | 4/2004 | Cassily | ...................... | 600/300 |
| 2001/0020904 A1 | 9/2001 | Dayle | | |
| 2001/0036621 A1 | 11/2001 | Logan | | |
| 2001/0036623 A1 | 11/2001 | Johnson | | |
| 2001/0046658 A1 | 11/2001 | Wasowicz | | |
| 2001/0049085 A1 | 12/2001 | Wasowicz | | |
| 2002/0051958 A1 * | 5/2002 | Khalsa | ....................... | 434/238 |
| 2002/0099276 A1 * | 7/2002 | Schmidt et al. | ............. | 600/300 |
| 2002/0192624 A1 * | 12/2002 | Darby et al. | ................ | 434/236 |
| 2003/0013981 A1 * | 1/2003 | Gevins et al. | .............. | 600/544 |
| 2003/0059750 A1 * | 3/2003 | Bindler et al. | ............. | 434/236 |
| 2003/0108849 A1 * | 6/2003 | Hodges | ...................... | 434/236 |
| 2003/0227479 A1 * | 12/2003 | Mizrahi et al. | ............. | 345/753 |
| 2004/0131998 A1 * | 7/2004 | Marom et al. | ............. | 434/236 |
| 2005/0084832 A1 * | 4/2005 | Janssen et al. | .............. | 434/236 |

* cited by examiner

*Primary Examiner*—Joe H. Cheng
(74) *Attorney, Agent, or Firm*—Welsh & Katz, Ltd.

(57) ABSTRACT

A therapy-based method for increasing the communications skills of children diagnosed with Pervasive Development Disorder ("PDD") through a combination of therapy steps performed in a particular order and for specific amounts of time. The method makes use of integrating language scripting, sensory integration, occupational and speech therapies, visual supports, and a structured routine, which teaches children diagnosed with PDD specific social-based interactions that improve the ability of those diagnosed with PDD to interact with others in common social settings.

6 Claims, 1 Drawing Sheet

METHOD FOR TREATING PERVASIVE DEVELOPMENT DISORDER

CROSS-REFERENCE TO RELATED APPLICATIONS

This application claims the benefit of the U.S. Provisional Application No. 60/369,990, filed Apr. 4, 2002, which is incorporated herein by reference.

FIELD OF THE INVENTION

The invention disclosed herein relates to a therapy based method for treating children diagnosed as having Autism and other Pervasive Developmental Disorders (hereinafter "PDD"). More particularly, the method involves a combination of therapies that can be performed in a particular order and can be subject to a specified schedule.

BACKGROUND OF THE INVENTION

PDD are a class of disorders defined by various diagnostic systems, including the Diagnostic and Statistical Manual of Mental Disorders, 4th edition (DSM-IV). Various disorders are contained within the PDD designation, including Autistic Disorder, Rett's Disorder, Childhood Disintegrative Disorder, PDD-NOS (PDD—Not Otherwise Specified), and Asperger's Disorder. These various conditions are characterized by differing degrees of impairment relating to social interaction and communications skills. All of the variations of PDD negatively impact the ability of children to interpret and regulate sensory information, initiate and maintain conversations, and identify and respond appropriately to social cues. PDD can be characterized by multiple distortions in the development of basic psychological functions that are involved in the development of social skills and language, such as attention, perception reality testing and motor movement. These disorders can also be accompanied by manifestations of disturbances of organization, distractibility, impulsivity, restlessness, and other disturbances of language and/or social behavior. Many conventional methods, such as dietary alteration, medication, and behavioral modification have been used for treating individuals diagnosed with PDD related disorders.

Treatments of various types have long been used to treat various developmental disabilities of children, including PDD. Past treatments for PDD in children range from treatment with prescription drugs to behavioral programs that employ a wide range of individual therapies (e.g., speech therapy, occupational therapy, scripting therapy, drug therapies, play therapy, vitamin therapy, and various applied behavior analysis therapies) in an effort to produce consistent and repeatable results. However, past treatments and therapies have met with varying degrees of success, none have consistently produced desired results, and many require large amounts of personalization based on the abilities of each subject child. Progress in the field of PDD has been difficult due to a number of factors, including the breadth of the behavior that falls into the category of PDD, a large increase of diagnosis of persons with PDD in the last decade, and the multitude of individualized symptoms that can be exhibited by children who have PDD, which may require different approaches. Thus, there is a need for a method for treating children with PDD that provides a relatively standardized regimen of behavioral treatment steps. Furthermore, there is a need for a method for treating children with PDD which utilizes a combination of therapies on a repetitive schedule that is easy to implement in classroom situations in which numerous children with PDD are treated simultaneously as a group with the same combination of therapy steps.

It has been recognized that individuals who are non-verbal or speech-impaired and/or diagnosed with a PDD have many problems in terms of communicating with others. Attempts have been made in the art to improve the communication skills, effective semantic and/or syntactic skills of such individuals, which include devices and techniques geared towards establishing communication and an increased vocabulary, morphology and syntax.

In one example, U.S. Pat. No. 6,056,549 discloses a communication and teaching aid in the form of a book structure having a plurality of movably mounted pages each of which serves as a support structure for a plurality of demonstration pieces. Each of the demonstration pieces have an alpha-numeric display or a pictorial representation with a word or phrase label where the informative indicia is representative of common objects, activities, statements, phrases, questions, answers, etc. The demonstration pieces are affixed to the movably mounted pages such that the informative indicia on the various demonstration pieces are arranged to create an individualized word-labeled pictorial display. This type of visual support can be useful in treating PDD, but a disadvantage is the lack of overall structure in which such visual supports can be also used as a part of a broader therapy based teaching interaction to multiply the comprehension of the student and accordingly the advantages of such visual supports. Visual supports can be videotaped sequences of actors displaying a chosen set of role-playing activities as well.

DETAILED DESCRIPTION OF THE INVENTION

Figure 1:
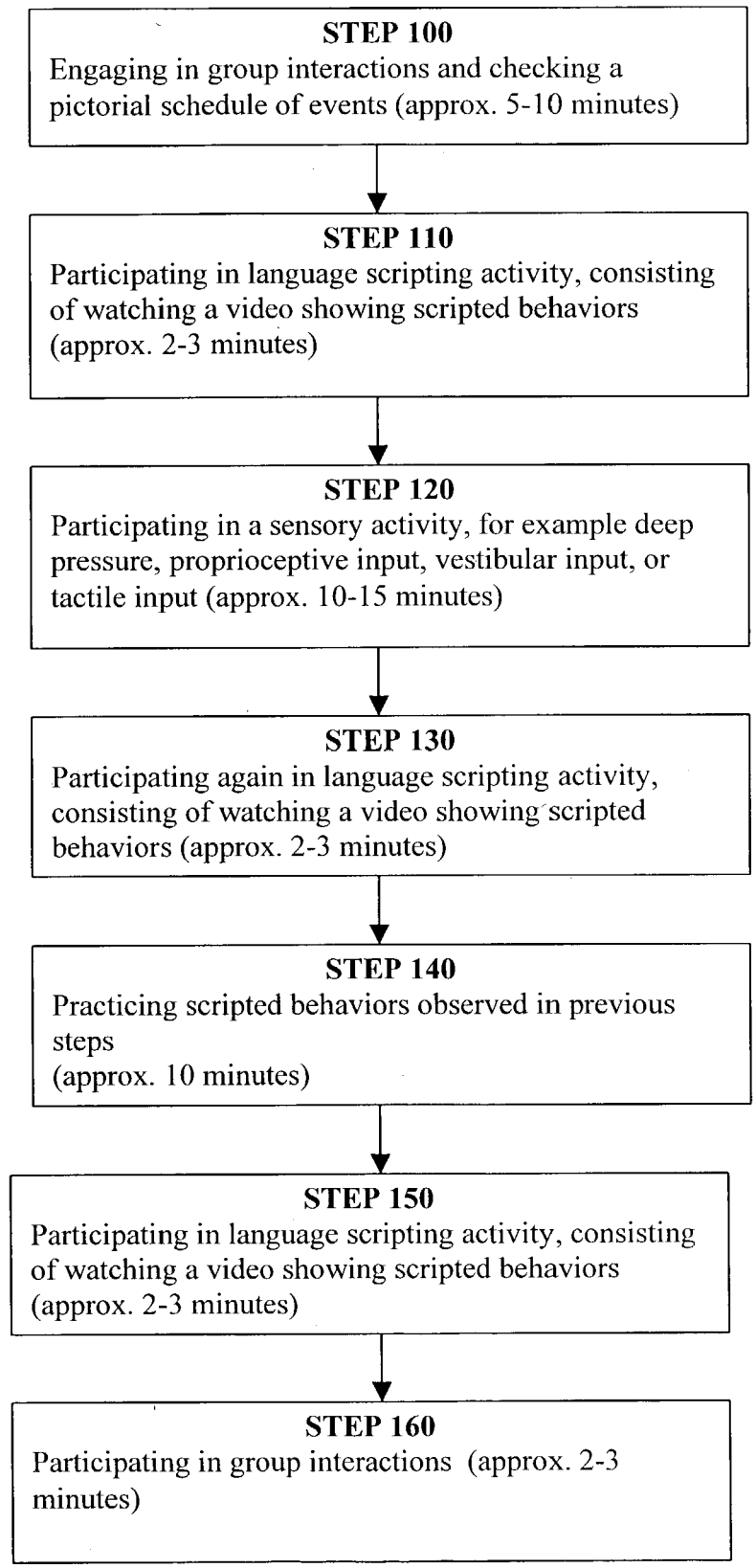
FIG. 1 is a flow chart embodying one example of the method of the invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely "Detailed Description Of The Invention," relates to a requirement of the United States Patent Office, and does not imply, nor should be inferred to limit the subject matter disclosed herein.

All patents referred to herein are incorporated herein by reference.

In the present disclosure, the words "a" or "an" are to be taken to include both the singular and the plural. Conversely, and reference to plural items shall, where appropriate, include the singular.

The invention provides a method for treating various developmental disabilities of children, including PDD, that provides a broad therapy based structure that integrates a structured routine with language scripting, sensory integration, integration of occupational and speech therapies, and visual supports.

As will be appreciated by those of ordinary skill in the art, benefits accompanying use of the method described herein can include increasing the ability of children with a Pervasive Developmental Disorder to interact spontaneously and appropriately in a variety of typical social settings. Specific benefits that have been observed in target children when the method has been employed include: awareness of peers within a group, turn-taking skills, ability to wait between turns, ability to identify their own sensory needs, initiation of interactions with peers both verbally and non-verbally, reciprocal play without immediate modeling, desire to participate with partners during sensory activities, use of scripted language during semi-structured play with peers, use of spontaneous scripted language across play themes, use socially appropriate greetings and phrases The aspects of the method of the present invention can be combined in a specified pattern and can be subjected to a particularized schedule over a specific period of time. The method can achieve observable and repeatable changes in the target behavior of the children who have PDD. The structured routine, used in combination with language scripting, sensory integration, integration of occupational and speech therapies, and visual support results in a sustained optimal level of arousal for children with PDD, and positively impacts the ability of these children to learn social interactions that are the subject of the therapies. This method has proven extremely effective in maintaining social interaction skills for children.

The present invention has been developed to solve the needs which remain in the art, as discussed above, and specifically, is directed to a therapeutic method for treating children diagnosed as having Autism and other PDD related disorders. The process of the invention for treating children with PDD can incorporate a structured schedule and routine in which the following elements are present: language scripting (in either pictorial form or in video form), sensory integration, occupational and speech therapies, and visual support.

Language scripting teaches communications skills, makes interactions predictable, and may be presented in written/pictorial or video formats. Language scripting is well known to those in the art, and explained in references, for example "The Original Social Story Book" by Carol Gray (1993). One example of language scripting in this invention is the use of a series of pictures in combination with written words that are designed to visually represent a particular idea. A given written/pictorial scripting element can present a 1:1 picture to word correspondence and can also provide a dialogue in written/pictorial form. Another example of language scripting in this invention is the use of a videotaped sequence in which visual stimuli are used to visually represent a particular idea and communicate this information to the individual watching the video. The types of activities that can be scripted are almost limitless, and examples include: rules for talking and playing; playing with modeling clay; talking on the phone, playing doctor; playing house; playing restaurant; and playing on the playground.

Sensory integration, can involve engaging in various tasks that provide multiple types of stimulation to integrate the brain's ability to receive, organize, interpret and effectively use information provided to all the body's senses. Sensory integration is well known to those skilled in the art, and explained in references, for example "Sensory Integration Theory and Practice" by Anne Fisher, Elizabeth Murray, Anita Bundy, (F.A. Davis Company, 1991). Sensory integration impacts social interaction, motor skill development, and ability of a child to attend. Sensory integration therapy assists in maximizing the effectiveness of the method described herein by maintaining the optimal state of arousal for the children who are the subjects of this method. The optimal state of arousal varies with each child participant and with the activity performed. Examples of elements that can be used as part of providing sensory integration can include deep pressure, proprioceptive input, vestibular input, and tactile input.

The use of integrated occupational and speech therapies can be important to certain embodiments of this invention because it permits the regulation of the arousal state of the subject child. With appropriate regulation of the child's arousal state, language scripting has proven to be more effective, and achieves better results.

The visual support that is part of the described method presents auditory input along with visual support in order to facilitate learning. One example of visual support that can be used in conjunction with the method described herein is a photo schedule board that graphically communicates the day's schedule to the children participating in the method described herein. Visual support is important because children with PDD have difficulty identifying and responding to social cues and difficulty processing auditory input.

The use of a highly structured routine can be of great value in this method because unstructured time can create anxiety for the participants in the program. In addition, a structured routine creates predictability and helps the children to manage transitions. Finally, the predictability of a set schedule helps the children maintain an optimal state of arousal, resulting in a more effective learning experience. One example of a highly structured routine is the consistent use of a daily schedule with limited variability from day to day.

In a preferred embodiment of the invention, the following schedule of tasks can be completed within the timeframe of approximately one hour for various days of the week, as shown in FIG. 1: step 100 shows engaging in group interactions and checking a pictorial schedule of events (each day for approximately 5–10 minutes); step 110 shows participating in language scripting, which can be watching a video containing a specified set of behaviors acted out by persons (each day for approximately 2–3 minutes); step 120 shows participating in a sensory activity, which can be deep pressure, proprioceptive input, vestibular input, and tactile input (each day for approximately 10–15 minutes); step 130 shows participating in language scripting, which can be watching a video containing a specified set of behaviors acted out by persons (Monday and Wednesday for approximately 2–3 minutes); step 140 shows practicing scripted behaviors observed in previous steps (Wednesday for approximately 10 minutes); step 150 shows participating in language scripting, which can be watching a video containing a specified set of behaviors acted out by persons (Monday and Wednesday for approximately 2–3 minutes); step 160 shows engaging in group interactions (approximately 2 minutes).

These steps are typically repeated substantially every day the therapy is used, with variations for differing days of the week. In one embodiment, the above described therapy schedule can preferably be used three days a week for a total of eight weeks. The times specified for each step of the process can be altered slightly, in order to tailor the program to the general needs of the children and the behaviors exhibited by the children on any given day. For example, the engaging in group interactions step can last from approximately 5 to 10 minutes depending on the behaviors present in the learning environment.

In one embodiment of the method, the above-described schedule can be combined with a daily regimen of homework for the child with PDD, in which the homework may comprise watching a video relating to the behavior that is the subject of the scripting therapy used in conjunction with the method described herein.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the invention.

What is claimed is:

1. A therapeutic method for treating an individual diagnosed with a pervasive development disorder (PDD) that integrates a structured routine with language scripting, sensory integration, integration of occupation and speech therapies, and visual supports, said method comprising the steps of:

first, engaging the individual in a group activity in which a plurality of participants interact socially with the individual;

second, engaging the individual in language scripting in which communications skills are taught to the individual through a written/pictorial or video format;

third, providing sensory integration to the individual in which the sensory integration consists essentially of deep pressure, proprioceptive input, vestibular input, or tactile input;

fourth, having the individual practice pre-scripted behavior observed in previous steps;

fifth, providing the individual in language scripting in which communications skills are taught to the individual through a written/pictorial or video format in response to the result of the individual's practice; and sixth, engaging the individual in the group interaction based on the modified learning environment; thereby treating said persuasive development disorder in said individual.

2. The method of claim 1, wherein the step of engaging the individual in group activity lasts for between 5–10 minutes.

3. The method of claim 1, wherein the step of engaging the individual in language scripting lasts for between 2–3 minutes.

4. The method of claim 1, wherein the step of providing sensory integration to the individual lasts for between 10–15 minutes.

5. The method of claim 1, wherein the step of having the individual practice scripted behaviors lasts for approximately 10 minutes.

6. The method of claim 1, wherein the Pervasive Development Disorder is one of Autistic Disorder, Rett's Disorder, Childhood Disintegrative Disorder, PDD-NOS (PDD—Not Otherwise Specified), or Asperger's Disorder.

* * * * *